United States Patent
Yin et al.

(10) Patent No.: US 9,912,905 B2
(45) Date of Patent: Mar. 6, 2018

(54) METHOD AND DEVICE FOR IMPLEMENTING ANALOG HIGH-DEFINITION IMAGE CAPTURING

(71) Applicant: ZHEJIANG DAHUA TECHNOLOGY CO., LTD., Hangzhou (CN)

(72) Inventors: Jun Yin, Hangzhou (CN); Xingming Zhang, Hangzhou (CN); Liquan Fu, Hangzhou (CN); Jiangming Zhu, Hangzhou (CN); Jun Wu, Hangzhou (CN); Jian Wu, Hangzhou (CN)

(73) Assignee: ZHEJIANG DAHUA TECHNOLOGY CO., LTD, Hangzhou (CN)

( * ) Notice: Subject to any disclaimer, the term of this patent is extended or adjusted under 35 U.S.C. 154(b) by 40 days.

(21) Appl. No.: 14/401,553

(22) PCT Filed: May 16, 2013

(86) PCT No.: PCT/CN2013/075701
§ 371 (c)(1),
(2) Date: Mar. 13, 2015

(87) PCT Pub. No.: WO2013/170759
PCT Pub. Date: Nov. 21, 2013

(65) Prior Publication Data
US 2015/0296173 A1 Oct. 15, 2015

(30) Foreign Application Priority Data

May 16, 2012 (CN) .......................... 2012 1 0151823

(51) Int. Cl.
*H04N 7/015* (2006.01)
*H04N 7/10* (2006.01)
(Continued)

(52) U.S. Cl.
CPC .......... *H04N 7/015* (2013.01); *G06T 1/0007* (2013.01); *H04N 7/10* (2013.01); *H04N 7/12* (2013.01); *H04N 7/18* (2013.01); *H04N 19/80* (2014.11)

(58) Field of Classification Search
CPC .............................. G06T 5/001; H04N 9/045
See application file for complete search history.

(56) References Cited

U.S. PATENT DOCUMENTS

| 4,652,903 | A | 3/1987 | Lucas |
| 8,144,227 | B2 | 3/2012 | Kobayashi |

(Continued)

FOREIGN PATENT DOCUMENTS

| CN | 101010944 | 8/2005 |
| CN | 201533372 | 7/2010 |

(Continued)

*Primary Examiner* — Twyler Haskins
*Assistant Examiner* — Fayez Bhuiyan
(74) *Attorney, Agent, or Firm* — Harness, Dickey & Pierce, P.L.C.

(57) ABSTRACT

Provided in embodiments of the present invention are a method and device for implementing high-definition image capturing, comprising: collecting and acquiring image data of a first set format by using an image sensor, image processing the image data then encoding into modulated data of a second set format, converting the modulated data into an analog electric signal of a third set format by using a synchronous clock, and filtering the analog electric signal by using a filter circuit then transmitting via a coaxial cable. The above series of operations is capable of implementing the collection and processing of a high-resolution video, and solves the problem that existing high-definition camera are incapable of ensuring timeliness during a video transmission process and provides poor stability and reliability, while at the same time, employment of the present invention also (Continued)

allows an existing analog camera to use a cable device for video transmission, thus implementing full utilization of existing resources.

8 Claims, 3 Drawing Sheets

(51) Int. Cl.
*H04N 7/12* (2006.01)
*H04N 7/18* (2006.01)
*H04N 19/80* (2014.01)
*G06T 1/00* (2006.01)

(56) References Cited

U.S. PATENT DOCUMENTS

| | | |
|---|---|---|
| 8,885,080 B2 | 11/2014 | Kobayashi |
| 2004/0223058 A1* | 11/2004 | Richter ................... H04N 5/77 348/207.1 |
| 2005/0149985 A1* | 7/2005 | Okamoto ............. H04N 5/4401 725/131 |
| 2008/0062312 A1 | 3/2008 | Song et al. |
| 2009/0147891 A1* | 6/2009 | Furukawa .............. H03D 3/007 375/346 |
| 2010/0194899 A1* | 8/2010 | Lam ......................... H04N 5/38 348/211.2 |
| 2011/0021165 A1* | 1/2011 | Lee ..................... H04L 27/3411 455/127.5 |
| 2012/0000981 A1 | 1/2012 | Meier et al. |

FOREIGN PATENT DOCUMENTS

| | | |
|---|---|---|
| CN | 101895699 | 11/2010 |
| CN | 102253915 | 11/2011 |
| CN | 102724392 | 10/2012 |

* cited by examiner

METHOD AND DEVICE FOR IMPLEMENTING ANALOG HIGH-DEFINITION IMAGE CAPTURING

The present application is a US National Stage of International Application No. PCT/CN2013/075701, filed May 16, 2013, designating the United States, and claiming the benefit of Chinese Patent Application No. 201210151823.5, filed with the Chinese Patent Office on May 16, 2012 and entitled "Method of and apparatus for analog high-definition photographing", which is hereby incorporated by reference in its entirety.

FIELD

The present invention relates to the field of communications and particularly to a method of and apparatus for analog high-definition photographing.

BACKGROUND

In the industry of safeguards, there are such increasing requirements of users on the definition of videos that the resolution of traditional analog video cameras have become unsatisfactory to the users. In response to this, network high-definition video cameras based upon network applications have emerged.

The resolution ratio of the network high-definition video cameras can be up to mega pixels or more so that the resolution of images can be satisfactory to the users. The traditional analog video cameras transmit videos over cable machineries whereas the network high-definition video cameras transmit videos over networks. As opposed to the traditional analog video cameras transmitting videos over cables machineries, the network high-definition video cameras may suffer from at least the following problems while transmitting acquired videos:

(1) The videos have to be compressed for transmission using the H.264 and other video compression technologies, so that images of the network high-definition video cameras may be transmitted with some problem, such as delay, etc., thus hindering real-time transmission of the videos.

(2) Instability of the networks may come with unsmooth transmission of the videos and even possibly with a loss of some video, thus failing to guarantee stability and reliability of transmitting the videos.

Moreover the analog video cameras have been upgraded to the network high-definition video cameras, but the network high-definition video cameras transmit videos over network lines, so the originally deployed cable machineries may not be utilized, thus resulting in a considerable waste of the resources.

SUMMARY

Embodiments of the invention provide a method of and apparatus for analog high-definition photographing so as to perform acquisition and processing and real-time, stable and reliable transmission of a high resolution ratio video.

An embodiment of the invention provides a method of analog high-definition photographing, the method including:

acquiring an image using an image sensor for image data in a first preset format;

image-processing the image data in the first preset format and encoding the processed image data into modulation data in a second preset format;

converting the modulation data in the second preset format into an analog electric signal in a third preset format using a synchronization clock with a sampling frequency which is a preset frequency; and filtering the analog electric signal in the third preset format using a filter circuit and transmitting the filtered analog electric signal in the third preset format to a supervision device over a coaxial cable.

An embodiment of the invention provides an apparatus for analog high-definition photographing, the apparatus including a sensor component, an image processing component, a digital to analog converting component and a filtering component, wherein:

the sensor component is configured to acquire an image using an image sensor for image data in a first preset format;

the image processing component is configured to image-process the image data in the first preset format, to encode the processed image data into modulation data in a second preset format and to transmit the modulation data to the digital to analog converting component along with a synchronization clock with a sampling frequency which is a preset frequency;

the digital to analog converting component is configured to convert the modulation data in the second preset format into an analog electric signal in a third preset format using the synchronization clock with the sampling frequency which is the preset frequency; and the filtering component is configured to filter the analog electric signal in the third preset format using a filter circuit and to transmit the filtered analog electric signal in the third preset format to a supervision device over a coaxial cable.

With the solution according to the embodiments of the invention, image data in a first preset format is acquired using an image sensor and image-processed and then encoded into modulation data in a second preset format, the modulation data is converted into an analog electric signal in a third preset format using a synchronization clock, and the analog electric signal is filtered using a filter circuit and then transmitted over a coaxial cable. With the series of operations above, a high-definition video can be acquired and processed, the problems of failing to guarantee real-time transmission of the video and of poor stability and reliability of the video in transmission of the video by the existing network high-definition video camera could be addressed. Meanwhile the originally deployed cable machineries used by the original analog video cameras may be utilized for radio transmission, thus make the most of the existing resources.

DETAILED DESCRIPTION

In view of the problems of unsatisfactory solution of the existing analog video camera, and of poor real-time transmission of a video and low stability and reliability of the video in transmission of the video by the existing network high-definition video camera, embodiments of the invention provide a solution in hardware to analog high-definition photographing, where with the use of hardware components distinct from those of the traditional analog video camera and network high-definition video camera, an image sensor of mega pixels or more is utilized, a high-definition analog video signal is transmitted via a baseband and a carrier analog signal to thereby accommodate demands of constructions and users. This solution is applicable to extended applications in the existing 1280 H high-definition format and 1920 H high-definition format.

The solution according to the invention will be described below with reference to the drawings and respective embodiments thereof.

First Embodiment

Figure 1:
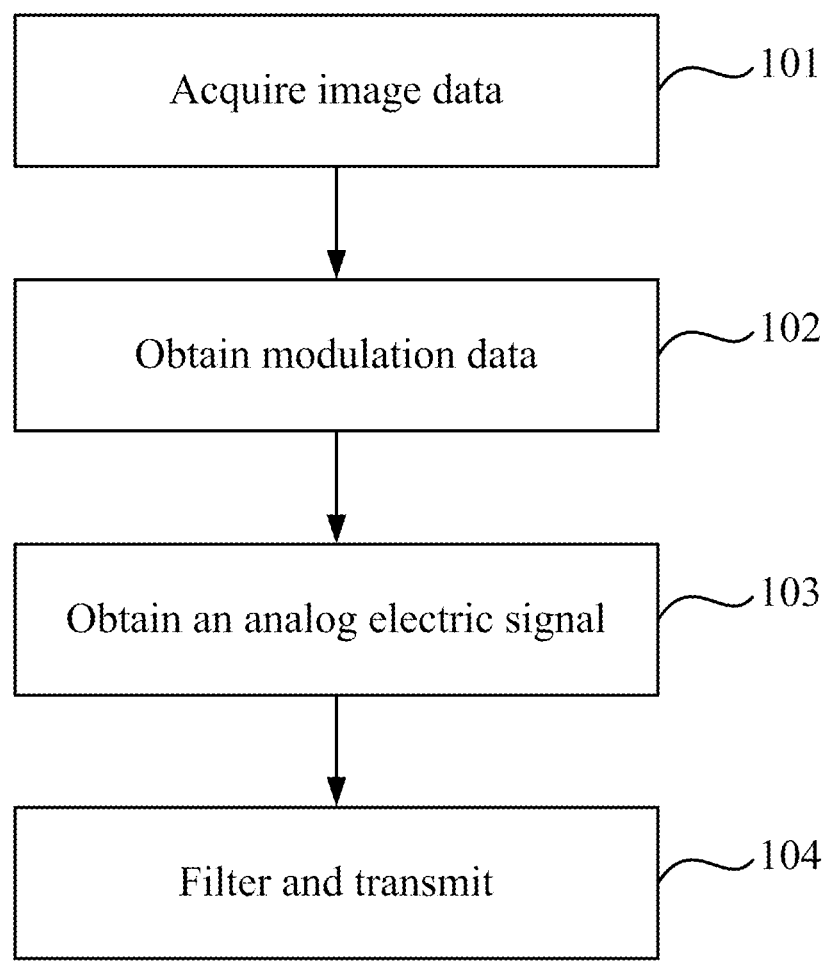
FIG. 1 is a flow chart of operations in a method of analog high-definition photographing according to a first embodiment of the invention.

The first embodiment of the invention provides a method of analog high-definition photographing, and FIG. 1 illustrates a flow of operations in the method including:

The operation 101 is to acquire image data.

In the solution according to this embodiment, an image can be acquired using an image sensor, e.g., a Complementary Metal Oxide Semiconductor (CMOS) sensor or a Charge-Coupled Device (CCD) sensor, and in order to acquire a high-definition video, the image can be acquired using the image sensor with the resolution of mega pixels or more. The image data acquired by the image sensor can be converted into a preset format for subsequent processing.

Thus in this operation, the image can be acquired using the image sensor for the image data in a first preset format.

In the solution according to this embodiment, the image sensor can be a CMOS sensor, where the specification of the CMOS sensor can be 720 P, 1080 P, etc.

The operation 102 is to obtain modulation data.

After the image data in the first preset format is acquired, the image data can be image-processed, e.g., image processing using an image processing 2A (Automatic White Balance, Auto Exposure) algorithm or an image processing 3A (Automatic White Balance, Auto Exposure, Auto Focus) algorithm, On-Screen Display (OSD), image scaling, image noise reduction or other particular image processing. After the image is processed, the processed image data can be encoded into modulation data in a second preset format for further processing.

Particularly the image data in the first preset format can be image-processed using a Field-Programmable Gate Array (FPGA) or an Application Specific Integrated Circuit (ASIC) and a memory, and the processed image data can be encoded into modulation data in a second preset format.

In this embodiment, when (or before) the operation 101 and the operation 102 are performed, the image sensor, the FPGA (or the ASIC) and the memory can be further configured using a Central Processing Component (CPU), for example, by setting parameters, OSD display contents, current functional states, etc. Moreover the image sensor, the FPGA (or the ASIC) and the memory can be configured via a communication interface, e.g., a Serial Peripheral Interface (SPI) or a serial bus (IIC).

The operation 103 is to obtain an analog electric signal.

After the modulation data is obtained (where the modulation data encompasses all the information about brightness and chroma), the modulation data in the second preset format can be converted into an analog electric signal in a third preset format using a synchronization clock with a sampling frequency which is a preset frequency for further processing.

In this operation, the modulation data in the second preset format can be converted by digital to analog converter into the analog electric signal in the third preset format using the synchronization clock with the sampling frequency which is the preset frequency. The modulation data can be converted into the analog electric signal in the 1280H format using the synchronization clock with the sampling frequency which is no lower than 100 MHz. The modulation data can be converted into the analog electric signal in the 1920H format using the synchronization clock with the sampling frequency which is no lower than 150 MHz.

The operation 104 is to filter and transmit the analog electric signal.

Before the analog electric signal is transmitted, the obtained analog electric signal in the third preset format can be filtered using a filter circuit, and the filtered analog electric signal in the third preset format can be transmitted to a supervision device over a coaxial cable, the filtered analog electric signal in the third preset format can be connected by a connector onto the coaxial cable for transmission. In this embodiment, the analog electric signal can be filtered using a high-bandwidth low-pass filter with a cutoff frequency higher than the bandwidth of the analog electric signal by a difference which is not above a threshold, thus addressing the problem of poor stability and reliability of video transmission due to poor stability of a network over which a high-definition video is transmitted. Moreover with the solution according to this embodiment, no high-definition video need to be video-compressed and encoded in transmission thereof, thus further addressing the problem of failing to guarantee real-time video transmission in transmission of the high-definition video over the network.

The solution according to the first embodiment of the invention will be described below in details.

Second Embodiment

Figure 2:
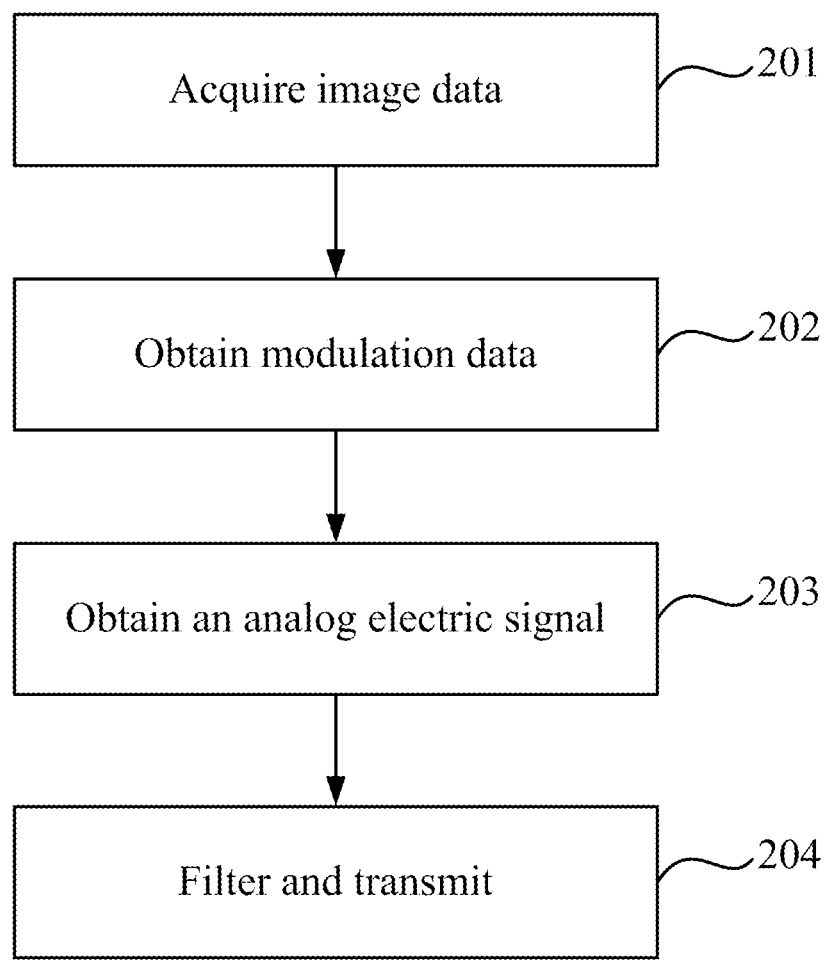
FIG. 2 is a flow chart of operations in a method of analog high-definition photographing according to a second embodiment of the invention.

The second embodiment of the invention provides a method of analog high-definition photographing, and FIG. 2 illustrates a flow of operations in the method including:

The operation 201 is to acquire image data.

In this operation, an image can be acquired using an image sensor with the resolution which is no less than mega pixels, e.g., a CMOS sensor, and the image data in a first preset format can be acquired. The image data can be acquired in the Bayer format of 12 bits, 14 bits or 16 bits, and of course the image data can also be acquired in the YC format (or the YUV format) of 12 bits, 14 bits or 16 bits.

The operation 202 is to obtain modulation data.

In this operation, after the acquired image data is image-processed, the processed image data can be encoded in an analog high-definition encoding scheme into the modulation data in a digital format of no less than 10 bits, e.g., 12 bits, for further processing.

The operation 203 is to obtain an analog electric signal.

Particularly in this operation, the modulation data can be converted into the analog electric signal in the third preset format using a synchronization clock with a sampling frequency which is no lower than 100 MHz, for example, the modulation data can be converted into the analog electric signal in the 1280 H format using the synchronization clock with the sampling frequency 108 MHz or 120 MHz to thereby obtain a high-definition video.

The operation 204 is to filter and transmit the analog electric signal.

In this operation, the analog electric signal in the third preset format can be filtered using a low-pass filter with a cutoff frequency which is no lower than 20 MHz, for example, the analog electric signal in the 1280 H format can be filtered using the low-pass filter with the cutoff frequency ranging from 20 MHz to 25 MHz, or the analog electric signal in the 1920 H format can be filtered using the low-pass filter with the cutoff frequency ranging from 30 MHz to 40 MHz, and the analog electric signal can be connected by a connector onto a coaxial cable so that the filtered analog electric signal can be transmitted over the coaxial cable to thereby transmit the analog high-definition video.

The following apparatus will be provided based upon the same inventive idea as the first embodiment and the second embodiment of the invention.

Third Embodiment

Figure 3:
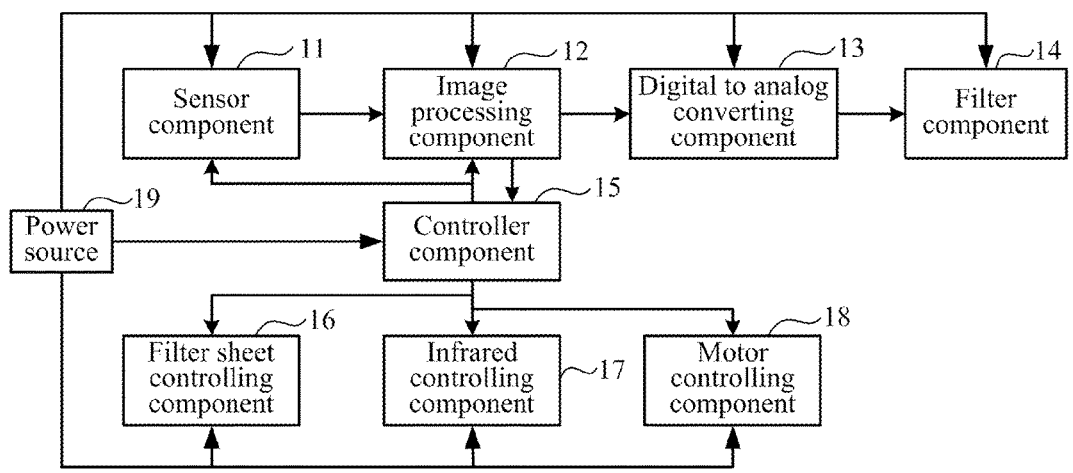
FIG. 3 is a schematic structural diagram of an apparatus for analog high-definition photographing according to a third embodiment of the invention.

The third embodiment of the invention provides an apparatus for analog high-definition photographing, and FIG. 3 illustrates a structure of the apparatus including a sensor component 11, an image processing component 12, a digital to analog converting component 13 and a filtering component 14, where:

The sensor component 11 is configured to acquire an image using an image sensor for image data in a first preset format; the image processing component 12 is configured to image-process the image data in the first preset format, to encode the processed image data into modulation data in a second preset format and to transmit the modulation data to the digital to analog converting component along with a synchronization clock with a sampling frequency which is a preset frequency; the digital to analog converting component 13 is configured to convert the modulation data in the second preset format into an analog electric signal in a third preset format using the synchronization clock with the sampling frequency which is the preset frequency; and the filtering component 14 is configured to filter the analog electric signal in the third preset format using a filter circuit and to transmit the filtered analog electric signal in the third preset format to a supervision device over a coaxial cable.

The image processing component 12 is particularly configured to encode the processed image data into the modulation data in a digital format of no less than 10 bits in an analog high-definition encoding scheme and to transmit the modulation data to the digital to analog converting component along with the synchronization clock with the sampling frequency which is no lower than 100 MHz; the digital to analog converting component 13 is particularly configured to convert the modulation data in the digital format of no less than 10 bits into the analog electric signal in the third preset format using the synchronization clock with the sampling frequency which is no lower than 100 MHz; and the filtering component 14 is particularly configured to filter the analog electric signal in the third preset format using a lower-pass filter with a cutoff frequency which is no lower than 20 MHz.

Moreover the filtering component 14 is particularly to connect the filtered analog electric signal in the third preset format onto the coaxial cable through a connector for transmission.

The sensor component 11 can be appreciated as including an image sensor and peripheral circuits thereof.

The image processing component 12 is particularly configured to image-process the image data in the first preset format using a Field Programmable Gate Array (FPGA) and a memory and to encode the processed image data into the modulation data in the second preset format; or to image-process the image data in the first preset format using an Application Specific Integrated Circuit (ASIC) and a memory and to encode the processed image data into the modulation data in the second preset format, where the image processing component 12 can perform image noise reduction and other processing using the memory.

The digital to analog converting component 13 is particularly to convert the modulation data in the second preset format into the analog electric signal in the third preset format by an analog to digital converter using the synchronization clock with the sampling frequency which is the preset frequency.

The apparatus further includes a controller component 15, where:

The controller component 15 is configured to configure the sensor component and the image processing component. The controller component 15 is particularly configured to configure the sensor component and the image processing component by a CPU. The controller component 15 can be appreciated as including the CPU and peripheral circuits thereof.

The controller component 15 is particularly configured to configure the sensor component and the image processing component via a Serial Peripheral Interface (SPI) or a IIC serial bus data interface.

Of course the apparatus can further include a filter sheet controlling component 16, an infrared controlling component 17 and a motor controlling component 18.

The controller component 15 can be further configured to control the filter sheet controlling component 16, the infrared controlling component 17 and the motor controlling component 18 in response to a feedback of the image processing component 12 by controlling the filter sheet controlling component 16 to switch an infrared filter sheet, controlling the infrared controlling component 17 to turn on or off an infrared lamp and controlling the motor controlling component 18 to drive a lens to zoom in or out.

The apparatus can further include a power source 19 configured to power the respective components.

In summary the apparatus according to this embodiment (which can be appreciated as an analog high-definition video camera) can include the sensor component 11, the image processing component 12, the controller component 15, the digital to analog converting component 13, the filtering component 14, the filter sheet controlling component 16, the infrared controlling component 17, the motor controlling component 18 and the power source 18, and the respective components in hardware modules operate cooperatively dependent upon an image data flow and a control mode. In order to ensure rapid digital to analog conversion by the digital to analog converting component 13 and high-rate transmission of the digital signal by the image processing component 12 to the digital to analog converting component 13, the digital to analog converting component 13 and the image processing component 12 can be embodied separately in this embodiment.

Of course the functions of the respective components in modules can be embodied separately, but a part or all of the components in modules can be functionally integrated in a circuit chip along with development of respective technologies as long as the respective functions of the components can be embodied fully.

For example the functions of the image processing component 12 and the digital to analog converting component 13 can be embodied in an integrated circuit chip, and the functions of the other respective components in hardware modules can be embodied separately. Alternatively all the functions of the image processing component 12, the controller component 15 and the digital to analog converting component 13 can be embodied in an integrated circuit chip, and the functions of the other respective components in hardware modules can be embodied separately. Alternatively the functions of the image processing component 12 and the controller component 15 can be embodied in an integrated circuit chip, e.g., a device of Model EP4CE115 available from Altera Corp., and the functions of the other respective components in hardware modules can be embodied separately.

The apparatus according to this embodiment can be applicable to various products categorized by their form factors, including a box camera, an eye ball camera, a hemisphere dome camera, a pinhole camera, a speed dome camera, etc., and by their safeguard functions, including a water-proof camera, a daily-use camera, a housing camera, a vandal-proof camera, etc.; and video cameras applicable to general lighting-free, infrared lighting, laser lighting, LED lighting, etc.

The apparatus according to this embodiment can be also applicable to a 1280 H analog high-definition enabled integrated analog video cameras and integrated cores.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method of analog high-definition photographing, the method comprising:
   acquiring image data;
   encoding and modulating the image data into digital modulation data;
   converting the digital modulation data into an analog electric signal in a 1280H format with a 108 MHz sampling frequency or a 120 MHz sampling frequency, or a 1920H format with a 150 MHz sampling frequency; and
   filtering the analog electric signal using a low-pass filter with a cutoff frequency, and transmitting the filtered analog electric signal over a coaxial cable to a supervision device.

2. The method of claim 1, wherein transmitting the filtered analog electric signal over the coaxial cable comprises:
   transmitting the filtered analog electric signal through a connector onto the coaxial cable for transmission.

3. The method of claim 1, wherein filtering the analog electric signal using a low-pass filter with a cutoff frequency includes:
   filtering the analog electric signal in the 1280H format using a low-pass filter with the cutoff frequency ranging from 20 MHz to 25 MHz; or
   filtering the analog electric signal in the 1920H format using a low-pass filter with the cutoff frequency ranging from 30 MHz to 40 MHz.

4. The method of claim 1, wherein the image data and the digital modulation data have a format of 720P or 1080P.

5. An apparatus for analog high-definition photographing, the apparatus comprising a sensor, an image processor, a digital to analog converter and a filter, wherein:
   the sensor is configured to acquire image data;
   the image processor is configured to encode and modulate the image data into digital modulation data;
   the digital to analog converter is configured to convert the digital modulation data into an analog electric signal in a 1280H format with a 108 MHz sampling frequency or a 120 MHz sampling frequency, or a 1920H format with a 150 MHz sampling frequency; and
   the filter is configured to filter the analog electric signal using a low-pass filter with a cutoff frequency and to transmit the filtered analog electric signal over a coaxial cable to a supervision device.

6. The apparatus of claim 5, wherein the filter is configured to transmit the filtered analog electric signal through a connector onto the coaxial cable for transmission.

7. The apparatus of claim 5, wherein the filter is configured to:
   filter the analog electric signal in the 1280H format using a low-pass filter circuit with the cutoff frequency ranging from 20 MHz to 25 MHz; or filter the analog electric signal in the 1920H format using a low-pass filter circuit with the cutoff frequency ranging from 30 MHz to 40 MHz.

8. The apparatus of claim 5, wherein the image data and the digital modulation data refer have a format of 720P or 1080P.

* * * * *